*Drawing restored from model; Original lost or mislaid.*
_____ / s/ J. Smith, _____ Chief Clerk
J. G. RAYMOND.
BOILER GAUGE COCK.
No. 69,702.            Patented Oct. 8, 1867.
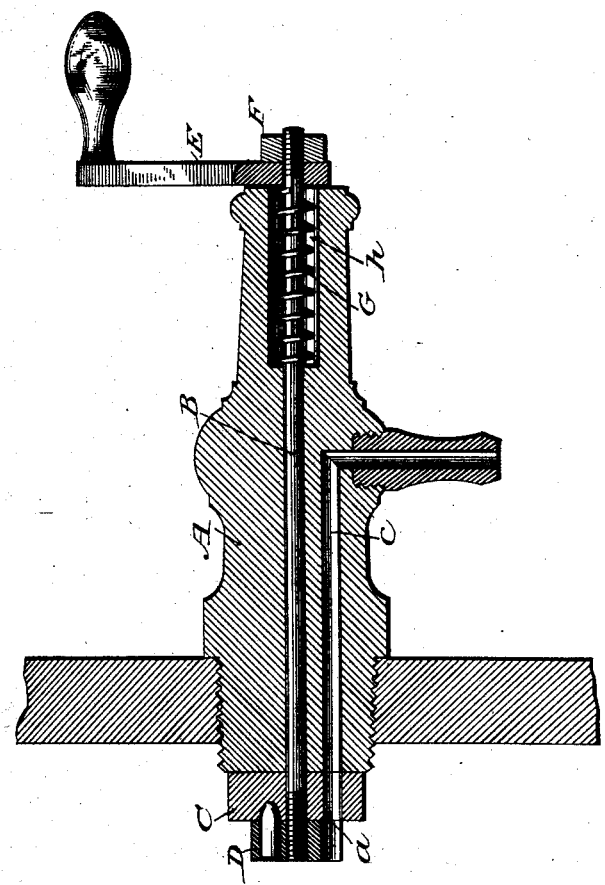

United States Patent Office.

JOHN G. RAYMOND, OF RONDOUT, NEW YORK.

Letters Patent No. 69,702, dated October 8, 1867.

---

IMPROVEMENT IN BOILER GAUGE-COCKS.

---

The Schedule referred to in these Letters Patent and making part of the same.

---

TO ALL WHOM IT MAY CONCERN:

Be it known that I, JOHN G. RAYMOND, of Rondout, in the county of Ulster, and State of New York, have invented a new and useful Improvement in Gauge-Cocks; and I do hereby declare that the following is a full, clear, and exact description thereof, which will enable those skilled in the art to make and use the same, reference being had to the accompanying drawings, forming part of this specification.

The object of this invention is the construction of a gauge-cock, (for ascertaining the height of water in steam-boilers,) which shall be cheap and simple in its construction, and effectual or safe in its operation; and it consists in the arrangement of a button or disk at the end of the tube or cock, which button is revolved or partially revolved by a rod to which it is attached, so that the apertures in the button and in the tube may correspond when steam or water is discharged, and a tight joint be at all times retained between the two, as will be hereinafter described.

The drawing represents a longitudinal central section of the gauge-cock.

Similar letters of reference indicate corresponding parts.

A is the tube, which is screwed into the head of the boiler, as represented. B is the rod, which passes through the tube A, having the button or disk on its inner end, which is marked C, and a crank on its outer end. D is a square cap, on the extreme end of the rod B, which is fastened to it by a pin, as seen. This is for the purpose of holding fast the rod B while the crank E is being screwed on to it. The crank E is held in place by the nut F. G is a spiral spring, which is placed in a recess, $h$, in the tube, and which bears upon the crank with a constant pressure, thereby keeping the button or disk C in contact with the end of the tube, whether the steam presses upon it or not. The joint between the disk C and the end of the tube is a ground joint, which is kept steam-tight at all times. $a$ indicates an aperture through the disk, and $c$ is an aperture in the tube.

When these apertures register or correspond, as seen in the drawing, steam or water will pass through, and be discharged from the cock, as indicated by the arrows. A slight turn of the crank closes the connection, as will at once be seen. By this arrangement no dirt or sediment can get into the joint to cause leakage, or interfere with the perfect operation of the cock.

Having thus described my invention, I claim as new, and desire to secure by Letters Patent—

The disk or button C, arranged substantially as described, in combination with the tube A and aperture $c$, as and for the purpose specified.

The above specification of my invention signed by me this 25th day of July, 1867.

JOHN G. RAYMOND.

Witnesses:
WM. F. MCNAMARA,
ALEX. F. ROBERTS.